(12) United States Patent
Su et al.

(10) Patent No.: US 9,565,404 B2
(45) Date of Patent: Feb. 7, 2017

(54) ENCODING TECHNIQUES FOR BANDING REDUCTION

(71) Applicant: Apple Inc., Cupertino, CA (US)

(72) Inventors: Yeping Su, Sunnyvale, CA (US); Hsi-Jung Wu, San Jose, CA (US); Hao Pan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 466 days.

(21) Appl. No.: 13/707,404

(22) Filed: Dec. 6, 2012

(65) Prior Publication Data

US 2014/0029663 A1    Jan. 30, 2014

Related U.S. Application Data

(60) Provisional application No. 61/677,381, filed on Jul. 30, 2012.

(51) Int. Cl.

| | |
|---|---|
| *H04N 7/26* | (2006.01) |
| *H04N 19/10* | (2014.01) |
| *H04N 19/117* | (2014.01) |
| *H04N 19/463* | (2014.01) |
| *H04N 19/14* | (2014.01) |
| *H04N 19/17* | (2014.01) |
| *H04N 19/80* | (2014.01) |
| *H04N 19/176* | (2014.01) |
| *H04N 19/61* | (2014.01) |
| *H04N 19/577* | (2014.01) |

(52) U.S. Cl.
CPC ........ *H04N 7/26005* (2013.01); *H04N 19/117* (2014.11); *H04N 19/14* (2014.11); *H04N 19/17* (2014.11); *H04N 19/463* (2014.11); *H04N 19/80* (2014.11); *H04N 19/176* (2014.11); *H04N 19/577* (2014.11); *H04N 19/61* (2014.11)

(58) Field of Classification Search
CPC .................................................. H04N 7/26005
USPC ..................................................... 375/240.29
IPC ......................................................... H04N 7/26
See application file for complete search history.

(56) References Cited

U.S. PATENT DOCUMENTS

| | | | |
|---|---|---|---|
| 6,385,329 B1 * | 5/2002 | Sharma et al. | 382/100 |
| 7,911,652 B2 | 3/2011 | Goodman et al. | |
| 8,004,578 B2 | 8/2011 | Chao | |
| 2004/0095511 A1 * | 5/2004 | Amara et al. | 348/620 |
| 2010/0046612 A1 | 2/2010 | Sun et al. | |
| 2010/0135575 A1 * | 6/2010 | Guo et al. | 382/164 |
| 2011/0075729 A1 | 3/2011 | Dane et al. | |
| 2011/0129020 A1 * | 6/2011 | Li et al. | 375/240.29 |
| 2014/0301486 A1 * | 10/2014 | Liao et al. | 375/240.27 |

\* cited by examiner

*Primary Examiner* — Yulin Sun
(74) *Attorney, Agent, or Firm* — Baker & Hostetler, LLP

(57) ABSTRACT

Video encoders often produce banding artifacts on areas with smooth gradients and low levels of detail/noise. In this disclosure, a video encoding system identifies the banded areas and adjusts coding parameters accordingly. The video coder may include a pre-coding banding detector and a post-coding banding detector. The pre-coding detector may identify regions in the input picture with smooth gradients that are likely to have banding artifacts after encoding. The post-coding detector may identify regions in the reconstructed picture with visible banding. Usage of pre-coding detector and/or post-coding detector depends on how an encoder operates. In a single-pass encoding or during the first pass of a multi-pass encoding, the pre-coding detection maps are used. During picture re-encoding or during later passes of a multi-pass encoding, the post-coding detector maps are used.

38 Claims, 3 Drawing Sheets

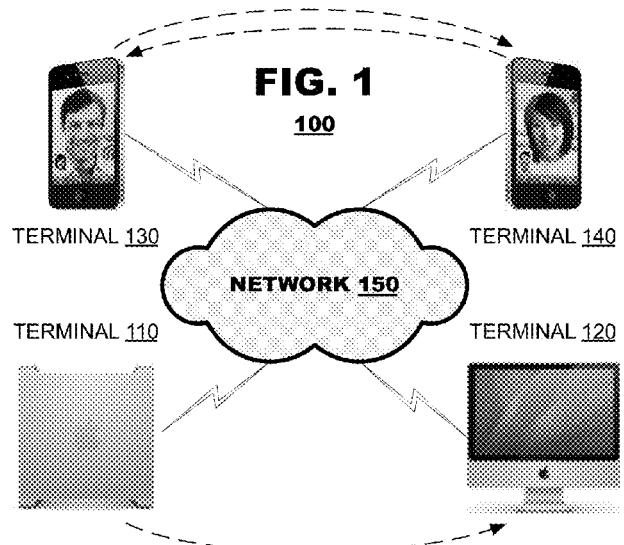
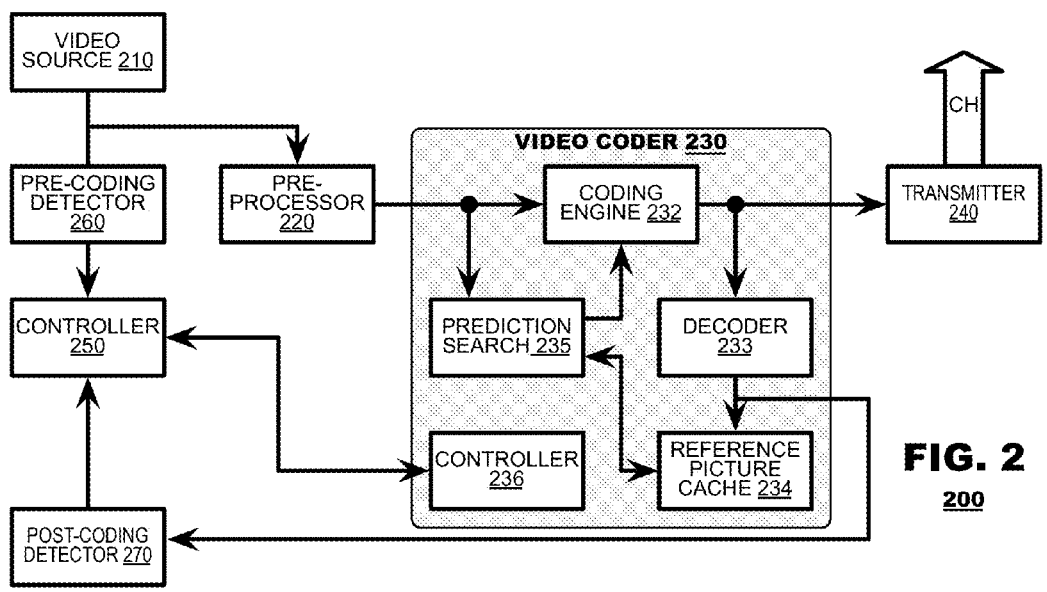

300

400

ENCODING TECHNIQUES FOR BANDING REDUCTION

CROSS-REFERENCE TO RELATED APPLICATION

This application claims the benefit of priority afforded by provisional application Ser. No. 61/677,381, filed Jul. 30, 2012, entitled "Encoding Techniques for Banding Reduction."

BACKGROUND

In video coder/decoder systems, a video coder may code a source video sequence into a coded representation that has a smaller bit rate than does the source video and, thereby may achieve data compression. The video coder may code processed video data according to any of a variety of different coding techniques to achieve compression. One common technique for data compression uses predictive coding techniques (e.g., temporal/motion predictive coding). For example, some frames in a video stream may be coded independently (I-frames) and some other frames (e.g., P-frames or B-frames) may be coded using other frames as reference frames. P-frames may be coded with reference to a single previously coded frame (called, a "reference frame") and B-frames may be coded with reference to a pair of previously-coded reference frames, typically a reference frame that occurs prior to the B-frame in display order and another reference frame that occurs subsequently to the B-frame in display order. The resulting compressed sequence (bit stream) may be transmitted to a decoder via a channel. To recover the video data, the bit stream may be decompressed at the decoder by inverting the coding processes performed by the coder, yielding a recovered video sequence.

To achieve high compression, the video coding processes typically are "lossy;" they permit a video decoder to recover a video sequence that is a replica of the source video sequence but has some errors. Thus, video coding systems often produce images with various types of coding artifacts including loss of detail, blockiness, ringing and banding. Such artifacts generally are more noticeable in still image content than in image content that exhibits a high degree of motion. Designers of video coding systems endeavor to provide coding systems that maintain high quality at appropriate bitrates and, therefore, avoid such display artifacts.

BRIEF DESCRIPTION OF THE DRAWINGS

FIG. 1 is a simplified block diagram of a video coding system according to an embodiment of the present invention.

FIG. 2 is a functional block diagram of a video coding system according to an embodiment of the present invention.

DETAILED DESCRIPTION

Figure 3:
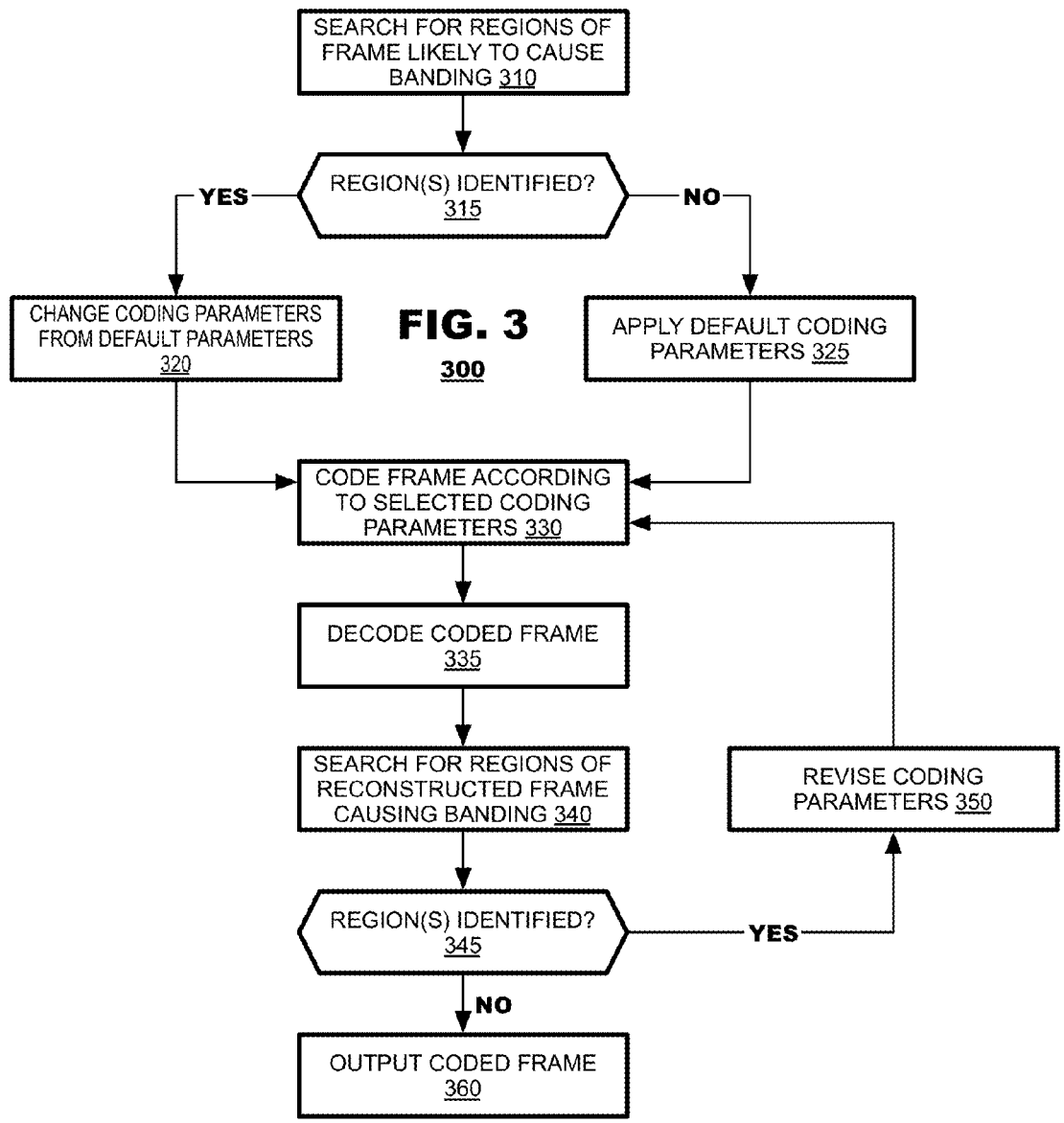
FIG. 3 illustrates a method of detecting banding artifacts in source video and coding such video according to an embodiment of the present invention.

Embodiments of the present invention provide video coding systems and methods that protect against banding artifacts in decoded image content. According to the method, a video coder may identify from the content of pixel blocks of a frame of video data which pixel blocks are likely to exhibit banding artifacts from the video coding/decoding processes. The video coder may identify regions of the frame that are likely to exhibit banding artifacts based on the identified pixel blocks' locations with respect to each other. The video coder may apply anti-banding processing to pixel blocks within one or more of the identified regions and, thereafter, may code the processed frame by a compression operation.

FIG. 1 is a simplified block diagram of a video coding system 100 according to an embodiment of the present invention. The system 100 may include at least two terminals 110-120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission is common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 are illustrated as servers, personal computers and smart phones but the principles of the present invention are not so limited. Embodiments of the present invention find application with laptop computers, tablet computers, media players and/or dedicated video conferencing equipment. The network 150 represents any number of networks that convey coded video data among the terminals 110-140, including, for example, wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 are immaterial to the operation of the present invention unless explained hereinbelow.

FIG. 2 is a functional block diagram of a video coding system 200 according to an embodiment of the present invention. The system 200 may include a video source 210 that provides video data to be coded by the system 200, a pre-processor 220, a video coder 230, a transmitter 240 and a controller 250 to manage operation of the system 200.

The video source 210 may provide video to be coded by the rest of the system 200. In a media serving system, the video source 210 may be a storage device storing previously prepared video. In a videoconferencing system, the video source 210 may be a camera that captures local image information as a video sequence. Video data typically is provided as a plurality of individual frames that impart motion when viewed in sequence. The frames themselves typically are organized as a spatial array of pixels.

The pre-processor 220 may perform various analytical and signal conditioning operations on video data. The pre-processor 220 may parse input frames into color components (for example, luminance and chrominance components) and also may parse the frames into pixel blocks, spatial arrays of pixel data, which may form the basis of further coding. The pre-processor 220 also may apply various filtering operations to the frame data to improve efficiency of coding operations applied by a video coder 230.

The pre-processor 220 also may search for video content in the source video sequence that is likely to generate artifacts when the video sequence is coded by the system 200, then decoded and displayed by another terminal. "Banding" is one of the artifacts that the pre-processor 220 may identify. Banding may occur in areas of source frames that are generally smooth and exhibit a gradual transition within the area. When such frames are coded, then decoded and displayed, a gradual transition may not be preserved; instead, the transition may be displayed as a plurality of discrete changes in the area of the reconstructed frame. The pre-processor 220 may identify to the controller 250 portions of the video sequence in which banding artifacts may arise.

The video coder 230 may perform coding operations on the video sequence to reduce the video sequence's bit rate. The video coder 230 may include a coding engine 232, a local decoder 233, a reference picture cache 234, a predictor 235 and a controller 236. The coding engine 232 may code the input video data by exploiting temporal and spatial redundancies in the video data and may generate a datastream of coded video data, which typically has a reduced bit rate as compared to the datastream of source video data. As part of its operation, the video coder 230 may perform motion compensated predictive coding, which codes an input frame predictively with reference to one or more previously-coded frames from the video sequence that were designated as "reference frames." In this manner, the coding engine 232 codes differences between pixel blocks of an input frame and pixel blocks of reference frame(s) that are selected as prediction reference(s) to the input frame.

The local decoder 233 may decode coded video data of frames that are designated as reference frames. Operations of the coding engine 232 typically are lossy processes. When the coded video data is decoded at a video decoder (not shown in FIG. 2), the recovered video sequence typically is a replica of the source video sequence with some errors. The local decoder 233 replicates decoding processes that will be performed by the video decoder on reference frames and may cause reconstructed reference frames to be stored in the reference picture cache 234. In this manner, the system 200 may store copies of reconstructed reference frames locally that have common content as the reconstructed reference frames that will be obtained by a far-end video decoder (absent transmission errors).

The predictor 235 may perform prediction searches for the coding engine 232. That is, for a new frame to be coded, the predictor 235 may search the reference picture cache 234 for image data that may serve as an appropriate prediction reference for the new frames. The predictor 235 may operate on a pixel block-by-pixel block basis to find appropriate prediction references. In some cases, as determined by search results obtained by the predictor 235, an input frame may have prediction references drawn from multiple frames stored in the reference picture cache 234.

The controller 236 may manage coding operations of the video coder 230, including, for example, selection of coding parameters to meet a target bit rate of coded video. Typically, video coders operate according to constraints imposed by bit rate requirements, quality requirements and/or error resiliency policies; the controller 236 may select coding parameters for frames of the video sequence in order to meet these constraints. For example, the controller 236 may assign coding modes and/or quantization parameters to frames and/or pixel blocks within frames.

The transmitter 240 may buffer coded video data to prepare it for transmission to the far-end terminal (not shown). The transmitter 240 may merge coded video data from the video coder 230 with other data to be transmitted to the terminal, for example, coded audio data and/or ancillary data streams (sources not shown).

The controller 250 may manage operation of the system 200. During coding, the controller 250 may assign to each frame a certain frame type (either of its own accord or in cooperation with the controller 236), which can affect the coding techniques that are applied to the respective frame. For example, frames often are assigned as one of the following frame types:

An Intra Frame (I frame) is one that is coded and decoded without using any other frame in the sequence as a source of prediction, A Predictive Frame (P frame) is one that is coded and decoded using earlier frames in the sequence as a source of prediction.

A Bidirectionally Predictive Frame (B frame) is one that is coded and decoded using both earlier and future frames in the sequence as sources of prediction.

Frames commonly are parsed spatially into a plurality of pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frames. For example, pixel blocks of I frames can be coded non-predictively or they may be coded predictively with reference to pixel blocks of the same frame (spatial prediction). Pixel blocks of P frames may be coded non-predictively, via spatial prediction or via temporal prediction with reference to one previously coded reference frame. Pixel blocks of B frames may be coded non-predictively, via spatial prediction or via temporal prediction with reference to one or two previously coded reference frames.

The system 200 may operate according to a coding policy, which is implemented by the controllers 250 and 236 that select coding parameters to be applied by the video coder 230 in response to various operational constraints. Such constraints may be established by, among other things: a data rate that is available within the channel to carry coded video between terminals, a size and frame rate of the source video, a size and display resolution of a display at a terminal that will decode the video, and error resiliency requirements required by a protocol by which the terminals operate. Based upon such constraints, the controllers 250/236 may select a target bit rate for coded video (for example, as N bits/sec) and an acceptable coding error for the video sequence. Thereafter, the controllers 250/236 may make various coding decisions to individual frames of the video sequence. For example, the controllers 250/236 may select a frame type for each frame, a coding mode to be applied to pixel blocks within each frame, and quantization parameters to be applied to frames and or pixel blocks. Thus, the controllers 250/236 may define a default set of coding parameters to be applied to source frames based on an operative coding policy to be performed by the system 200. In an embodiment, discussed below, the system 200 may revise coding parameters applied to source frames in order to combat banding artifacts.

As noted, the pre-coding detector 260 may search for video content in the source video sequence that is likely to generate artifacts when the video sequence is coded by the system 200, then decoded and displayed by another terminal. Similarly, the post-coding detector 270 may search for reconstructed video content generated by the video coder 230 in which banding artifacts are present. Banding may occur in areas of source frames that are generally smooth and exhibit a gradual transition within the area. When such frames are coded, then decoded and displayed, a gradual transition may not be preserved; instead, the transition may be displayed as a plurality of discrete changes in the area of the reconstructed frame.

FIG. 3 illustrates a method 300 of coding a frame of video data according to an embodiment of the present invention. According to the embodiment, the method 300 may begin by searching among video content of the frame for regions that are likely to cause banding when the frame is coded by a video coder (FIG. 1), decoded and rendered on a display (box 310). The method 300 may search across a video sequence for regions of video that are likely to cause banding. The method 300 may build a multidimensional detection map representing a region identified by the search, the detection map representing size of the region both spatially and temporally. The method 300 may search and identify regions based on size, shape and time duration. The method 300 may determine if any such regions are identified by the search (box 315). If such regions are identified by the search, the method 300 may revise a default set of coding parameters to be applied to the frame (box 320). However, if no such regions are identified by the search, the method 300 may apply the default set of coding parameters (box 325). The method 300 after deciding to apply the default parameters or change the coding parameters may cause the video frame to be coded according to the coding parameters selected in box 320 or 325 (box 330). The method 300 may then decode the coded video frame (box 335). The method 300 may next search for regions of the reconstructed frame that are likely to cause banding (box 340). Next, the method 300 may determine if any such regions are identified by the search of box 340 (box 345) and if so, may revise the coding parameters (box 350) and cause the frame to be recoded, returning to box 330. otherwise, the method 300 may output the coded frame for transmission in a channel (box 360). The method 300 may be managed by the controllers 250/236 (FIG. 2) of a video coder in cooperating with appropriate elements of the video coder 230.

As indicated, coding parameters may be revised from default coding parameters when banding artifacts are identified. The following discussion illustrates exemplary techniques for revising the coding parameters of video data in which banding artifacts are likely to occur:

The controllers 250/236 may alter quantization parameters of video within a given region adaptively based on the detection maps. A region can be defined on different granularities, including a scene, a frame, an image region within a frame, or an encoding block. In one embodiment lower Qp is used when banding is detected or estimated as stronger.

The controllers 250/236 may alter perceptual masking values of video within a given region adaptively based on the detection maps. A region can be defined on different granularities, including a scene, a picture, an image region within a picture, or an encoding block. The perceptual mask indicates how easily a loss of signal content can be observed, which in turn is used in setting quantization parameters. In one embodiment, lower masking is used when banding is detected or estimated as stronger.

During mode decision, the controllers 250/236 may alter the encoding size of a given block adaptively based on said detection maps. The coding block can correspond to a coding unit, a prediction unit or a transform unit as defined in the HEVC standard. In one embodiment, the controllers 250/236 may cause the video coder to parse input frames into smaller block sizes for regions where banding is estimated as likely.

During mode decisions, the controllers 250/236 may alter mode decisions for source frames adaptively based on the detection maps. A region can be defined on different granularities, including a scene, a picture, an image region within a picture, or an encoding block. In one embodiment Inter-frame coding mode is favored over Intra-frame coding mode for frames where banding is estimated as likely.

During frame/slice type decisions, the controllers 250/236 may alter frame/slice type assignments within a given picture and the temporal cadence of such assignments may be made adaptive to the said detection maps.

During pre-processing, the controllers 250/236 may add noise to the source image. The amount of noise to be applied to a given region may be made adaptive to the detection maps. A region can be defined on different granularities, including a scene, a picture, an image region within a picture, or an encoding block. In one embodiment stronger noise is applied for regions where banding is estimated as likely.

The controllers 250/236 may alter target bitrates of segments within the source video adaptively based on the detection maps. A segment can be a whole movie, a scene, a picture, or parts of a picture. In one embodiment the average bitrate is raised when banding is detected or is estimated as stronger.

The regions may constitute a detection map with multiple levels of granularity that may be further linearly or nonlinearly lowpass filtered or morphologically filtered from an initial binary detection map. Combined with the alpha blending technique, a detection map with multiple levels of granularity may prevent generating undesirable yet visible abrupt transitions between a detected banding region and its neighboring non-detected region.

The detection map further may be filtered temporally to increase consistency in time.

Pixel blocks' quantization parameters may be adjusted based on whether the pixel blocks' fall within the regions or not. Pixel blocks that fall within regions may be assigned relatively lower quantization parameters than pixel blocks that do not fall within regions.

Controllable noise is added to the input image, with the amount of noise modulated by the said detection map. The noise may be generated to be perceptually friendly and robust against compression.

Figure 4:
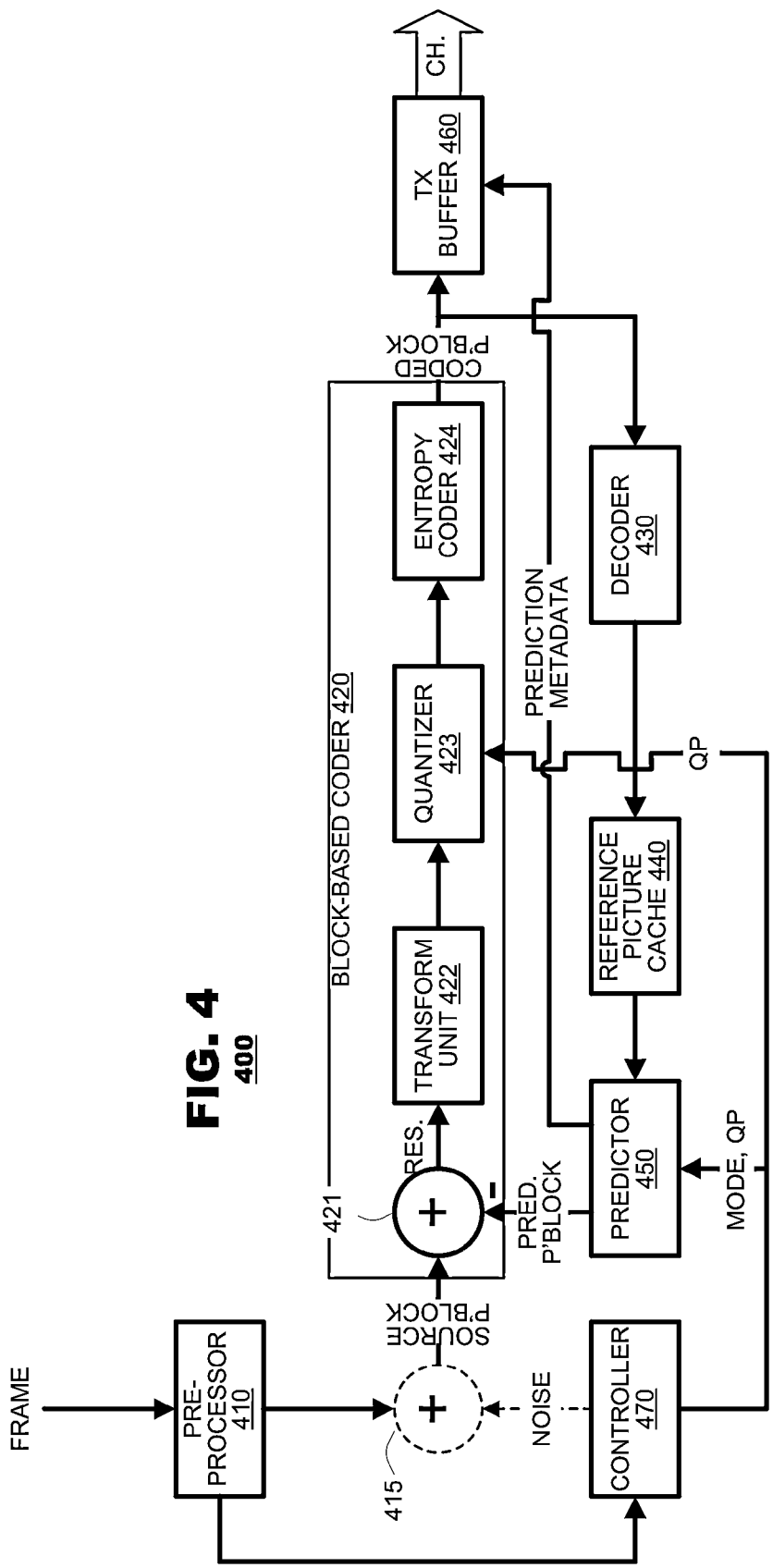
FIG. 4 is a simplified block diagram of a video coding system of another embodiment of the present invention.

FIG. 4 is a simplified block diagram of a video coding system 400 of another embodiment of the present invention. The system 400 may include a pre-processor 410, a block based coder 420, a reference frame decoder 430, a reference picture cache 440, a predictor 450, a transmit buffer 460 and a controller 470.

In addition to the operations described above in the FIG. 2 discussion, the pre-processor 410 may parse each frame into pixel blocks. When the pre-processor 410 identifies regions in which banding is likely to occur, it may identify such regions to a controller 470.

The block based coder 420 may include a subtractor 421, a transform unit 422, a quantizer unit 423 and an entropy decoder 424. The subtractor 421 that may generate data representing a difference between the source pixel block and a reference pixel block developed for prediction. The subtractor 421 may operate on a pixel-by-pixel basis, developing residuals at each pixel position over the pixel block. Non-predictively coded blocks may be coded without comparison to reference pixel blocks, in which case the pixel residuals are the same as the source pixel data.

The transform unit 422 may convert the source pixel block data to an array of transform coefficients, such as by a discrete cosine transform (DCT) process or a wavelet transform. The quantizer unit 423 that quantizes (divides) the transform coefficients obtained from the transform unit 422 by a quantization parameter Qp. The entropy coder 424 that may code quantized coefficient data by run-value coding, run-length coding or the like. Data from the entropy coder may be output to the channel as coded video data of the pixel block.

A reference frame decoder 430 that may decode pixel blocks of reference frames and assemble decoded data for such reference frames. Decoded reference frames may be stored in the reference picture cache 440.

The predictor 450 that may generate and output prediction blocks to the subtractor 421. The predictor 450 also may output metadata identifying type(s) of predictions performed. For inter-prediction coding, the predictor 450 may search among the reference picture cache for pixel block data of previously-coded and decoded frames that exhibits strong correlation with the source pixel block. When the predictor 450 finds an appropriate prediction reference for the source pixel block, it may generate motion vector data that is output to the decoder as part of the coded video data stream. The predictor 450 may retrieve a reference pixel block from the reference cache that corresponds to the motion vector and may output it to the subtractor 421. For intra-prediction coding, the predictor 450 may search among the previously coded and decoded pixel blocks of the same frame being coded for pixel block data that exhibits strong correlation with the source pixel block. Operation of the predictor 450 may be constrained by a mode selection provided by the controller 470. For example, if a controller selects an inter-coding mode for application to a frame, the predictor 450 will be constrained to use inter-coding techniques. If the controller selects an inter-prediction mode for the frame, the predictor may select among inter-coding modes and intra-coding modes depending upon results of its searches.

A transmit buffer 460 that accumulates metadata representing pixel block coding order, coded pixel block data and metadata representing coding parameters applied to the coded pixel blocks. The metadata can include prediction modes, motion vectors and quantization parameters applied during coding. Accumulated data may be formatted and transmitted to the channel.

A controller 470 to manage coding of the source video, including selection of a coding mode for use by the predictor 450 and selection of quantization parameters to by applied to pixel blocks.

The foregoing discussion has described operation of the embodiments of the present invention in the context of coders and decoders. Commonly, video coders are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
    identifying regions of a source frame that are likely to cause banding as a result of a coding process, wherein the source frame includes video data that has not previously been coded by the coding process, and wherein the identifying occurs prior to the coding process being applied to code the source frame;
    generating a detection map representing the identified regions;
    coding, through the coding process, regions outside of the detection map according to a first set of coding parameters associated with the coding process;
    coding, through the coding process, the identified regions on the detection map according to a second set of parameters, the second set representing the first set of parameters having been altered to reduce a likelihood that banding will occur in decoded video that is generated from the coded regions;
    decoding the coded regions;
    identifying decoded regions that are likely to cause banding; and
    coding the identified decoded regions according to the second set of parameters.

2. The method of claim 1, wherein the detection map includes size, shape and duration of the regions likely to cause banding.

3. The method of claim 2, wherein the detection map indicates a scene, a picture, an image region within a picture or an encoding block.

4. The method of claim 2, wherein a quantization parameter of the video is altered adaptively based on the detection maps.

5. The method of claim 2, wherein a perceptual masking value of the video within a given region is altered adaptively based on the detection maps.

6. The method of claim 2, wherein, during a coding mode decision, an encoding size of a given block is altered based on the detection maps.

7. The method of claim 2, wherein a coding mode selection is altered based on the detection maps.

8. The method of claim 2, wherein a frame or slice type assignment is decided upon within a given picture.

9. The method of claim 2, wherein noise is added to the source frame based on the detection maps.

10. The method of claim 2, wherein target bitrates are altered based on the detection maps.

11. The method of claim 2, wherein the detection map is filtered from an initial binary detection map.

12. The method of claim 2, wherein the detection map is filtered temporally.

13. The method of claim 1, wherein the coding of the regions outside the detection map and the coding of identify regions on the detection map each includes parsing the respective regions into blocks of variable sizes, wherein the second, altered parameters includes reducing sizes of blocks in the identified regions where banding is likely.

14. A video coding method, comprising:
searching across a video sequence to identify regions of video that are likely to cause banding as a result of a coding process, wherein the video sequence includes video data that has not previously been coded by the coding process, and wherein the searching occurs prior to the coding process being applied to code the video sequence;
building a multidimensional detection map representing a region identified by the search, the detection map representing a size of the region both spatially and temporally;
coding, through the coding process, regions outside of the detection map according to a first set of parameters associated with the coding process; and
coding, through the coding process, the regions identified on the detection map according to a second set of parameters, the second set representing the first set of parameters having been altered to reduce a likelihood that banding will occur in decoded video that is generated from the coded regions;
decoding the coded regions;
identifying decoded regions that are likely to cause banding; and
coding the identified decoded regions according to the second set of parameters.

15. The method of claim 14, wherein the detection map indicates a scene within the video sequence.

16. The method of claim 14, wherein a quantization parameter of the video is altered adaptively based on the detection maps.

17. The method of claim 14, wherein a perceptual masking value of the video within a given region is altered adaptively based on the detection maps.

18. The method of claim 14, wherein, during a coding mode decision, an encoding size of a given block is altered based on the detection maps.

19. The method of claim 14, wherein a coding mode selection is altered based on the detection maps.

20. The method of claim 14, wherein a frame or slice type assignment is decided upon within a given picture.

21. The method of claim 14, wherein noise is added to the source frame based on the detection maps.

22. The method of claim 14, wherein target bitrates are altered based on the detection maps.

23. The method of claim 14, wherein the detection map is filtered from an initial binary detection map.

24. The method of claim 14, wherein the detection map is filtered temporally.

25. The method of claim 14, wherein the coding of the regions outside the detection map and the coding of identify regions on the detection map each includes parsing the respective regions into blocks of variable sizes, wherein the second, altered parameters includes reducing sizes of blocks in the identified regions where banding is likely.

26. A video coding system, comprising:
a controller module configured to:
identify regions of a frame that are likely to cause banding as a result of a coding process, wherein the frame includes video data that has not previously been coded by the coding process, and wherein the search occurs prior to the coding process being applied to code the frame;
generate a detection map representing the identified regions;
code, through the coding process, regions outside of the detection map according to a first set of parameters associated with the coding process; and
code, through the coding process, the identified regions on the detection map according to a second set of parameters, the second set representing the first set of parameters having been altered to reduce a likelihood that banding will occur in decoded video that is generated from the coded region;
decode the coded regions;
identify decoded regions that are likely to cause banding; and
code the identified decoded regions according to the second set of parameters.

27. The system of claim 26, wherein the detection map includes size, shape and duration of the regions likely to cause banding.

28. The system of claim 27, wherein the detection map indicates a scene, a picture, an image region within a picture or an encoding block.

29. The system of claim 27, wherein the controller alters a quantization parameter of the video adaptively based on the detection map.

30. The system of claim 27, wherein the controller alters a perceptual masking value of the video within a given region adaptively based on the detection maps.

31. The system of claim 27, wherein during a coding mode decision the controller alters an encoding size of a given block based on the detection maps.

32. The system of claim 27, wherein the controller alters a coding mode selection based on the detection maps.

33. The system of claim 27, wherein the controller decides between a frame or slice type assignment within a given picture.

34. The system of claim 27, wherein the controller adds noise to the source frame based on the detection maps.

35. The system of claim 27, wherein the controller alters target bitrates based on the detection maps.

36. The system of claim 27, wherein the detection map is filtered from an initial binary detection map.

37. The system of claim 27, wherein the detection map is filtered temporally.

38. A non-transitory computer readable storage device, storing program instructions that when executed cause an executing device to perform a method for video coding, the method comprising:
identifying regions of a frame that are likely to cause banding as a result of a coding process, wherein the frame includes video data that has not previously been coded by the coding process, and wherein the searching occurs prior to the coding process being applied to code the frame;
generating a detection map representing the identified regions;
coding, through the coding process, regions outside of the detection map according to a first set of parameters associated with the coding process; and
coding, through the coding process, the identified regions on the detection map according to a second set of parameters, the second set representing the first set of parameters having been altered to reduce a likelihood that banding will occur in decoded video that is generated from the coded regions;
decoding the coded regions;

identifying decoded regions that are likely to cause banding; and coding the identified decoded regions according to the second set of parameters.

* * * * *